(12) United States Patent
Awazu et al.

(10) Patent No.: US 11,378,865 B2
(45) Date of Patent: Jul. 5, 2022

(54) IMAGING DEVICE

(71) Applicant: FUJIFILM Corporation, Tokyo (JP)

(72) Inventors: Kouhei Awazu, Saitama (JP); Masaaki Takagi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/158,327

(22) Filed: Jan. 26, 2021

(65) Prior Publication Data

US 2021/0149273 A1     May 20, 2021

Related U.S. Application Data

(63) Continuation of application No. PCT/JP2019/021625, filed on May 30, 2019.

(30) Foreign Application Priority Data

Jul. 27, 2018  (JP) .............................. JP2018-141575

(51) Int. Cl.
| | | |
|---|---|---|
| *G03B 9/36* | (2021.01) | |
| *G03B 17/14* | (2021.01) | |
| *H04N 5/232* | (2006.01) | |
| *G03B 5/00* | (2021.01) | |
| *H04N 5/225* | (2006.01) | |

(52) U.S. Cl.
CPC ................. *G03B 9/36* (2013.01); *G03B 5/00* (2013.01); *G03B 17/14* (2013.01); *H04N 5/2253* (2013.01); *H04N 5/23248* (2013.01)

(58) Field of Classification Search
CPC ...................................................... G03B 17/02
See application file for complete search history.

(56) References Cited

U.S. PATENT DOCUMENTS

| | | | |
|---|---|---|---|
| 5,715,479 A | 2/1998 | Katayama et al. | |
| 9,041,858 B2 * | 5/2015 | Jang ..................... | H04N 5/2253 |
| | | | 348/374 |
| 9,519,201 B2 * | 12/2016 | Kamada .................. | G03B 9/08 |
| 9,769,384 B2 * | 9/2017 | Nishihara ............ | H04N 5/2254 |
| 2006/0056839 A1 | 3/2006 | Abe et al. | |

(Continued)

FOREIGN PATENT DOCUMENTS

| | | |
|---|---|---|
| CN | 101782710 A | 7/2010 |
| CN | 102150080 A | 8/2011 |

(Continued)

OTHER PUBLICATIONS

International Search Report issued in PCT/JP2019/021625; dated Sep. 3, 2019.

(Continued)

*Primary Examiner* — Leon W Rhodes, Jr.
(74) *Attorney, Agent, or Firm* — Studebaker & Brackett PC

(57) ABSTRACT

A digital camera includes an image shake corrector that moves an imaging element to perform image shake correction, a shutter mechanism that has, at a position adjacent to a light receiving surface of the imaging element of the image shake corrector, an opening through which a member blocking light incident on the light receiving surface passes, an exterior housing that supports the shutter mechanism, and a mount base that supports the image shake corrector, in which the mount base is supported by the exterior housing.

17 Claims, 10 Drawing Sheets

(56) References Cited

U.S. PATENT DOCUMENTS

| | | | |
|---|---|---|---|
| 2007/0182824 A1 | 8/2007 | Nomura et al. |
| 2007/0182825 A1 | 8/2007 | Nomura et al. |
| 2010/0183288 A1 | 7/2010 | Kudoh |
| 2011/0164171 A1 | 7/2011 | Yasuda et al. |
| 2012/0008043 A1 | 1/2012 | Yasuda et al. |
| 2012/0020653 A1 | 1/2012 | Shintani |
| 2014/0293073 A1 | 10/2014 | Okamura et al. |
| 2017/0085799 A1 | 3/2017 | Yoshida |

FOREIGN PATENT DOCUMENTS

| | | | |
|---|---|---|---|
| CN | 103842901 A | 6/2014 |
| CN | 106575071 A | 4/2017 |
| JP | H07-036074 A | 2/1995 |
| JP | 2006-079009 A | 3/2006 |
| JP | 2007-206553 A | 8/2007 |
| JP | 2007-206642 A | 8/2007 |
| JP | 2008-096604 A | 4/2008 |
| JP | 2011-254261 A | 12/2011 |
| JP | 2012-032526 A | 2/2012 |
| JP | 2012-048215 A | 3/2012 |
| JP | 2017-169175 A | 9/2017 |

OTHER PUBLICATIONS

International Preliminary Report on Patentability issued in PCT/JP2019/021625; completed Jun. 4, 2020.

An Office Action mailed by China National Intellectual Property Administration dated Oct. 9, 2021 which corresponds to Chinese Patent No. 201980049989.6 and is related to U.S. Appl. No. 17/158,327 with English language translation.

* cited by examiner

IMAGING DEVICE

CROSS REFERENCE TO RELATED APPLICATION

This is a continuation of International Application No. PCT/JP2019/021625 filed on May 30, 2019, and claims priority from Japanese Patent Application No. 2018-141575 filed on Jul. 27, 2018, the entire disclosures of which are incorporated herein by reference.

BACKGROUND OF THE INVENTION

1. Field of the Invention

The present invention relates to an imaging device.

2. Description of the Related Art

As an imaging device comprising an imaging element that images a subject through an imaging optical system, or a lens device mounted on such an imaging device, a device including an image shake correcting unit that corrects shaking of a captured image (hereinafter, referred to as image shake) caused by vibration of the device has been known (see JP2006-079009A, JP2007-206553A, JP1995-036074A (JP-H07-036074A), and JP2012-048215A).

SUMMARY OF THE INVENTION

As disclosed in JP2006-079009A, JP2007-206553A, and JP2012-048215A, in the imaging device including the image shake correcting unit that moves the imaging element to correct the image shake, in a case where a mechanical shutter such as a focal plane shutter is disposed in the immediate vicinity (specifically, in front) of the imaging element, there is a possibility that the vibration due to the opening and closing operation of the mechanical shutter is transmitted to the image shake correcting unit, and the image shake cannot be corrected accurately.

The imaging device disclosed in JP2006-079009A has a configuration in which the mechanical shutter is disposed in front of the image shake correcting unit, but the above problems are not recognized.

The imaging device disclosed in JP2007-206553A has a configuration in which a lens is disposed between the image shake correcting unit and the mechanical shutter, a distance between the image shake correcting unit and the mechanical shutter is large, and thus the above problems are not recognized.

The imaging device disclosed in JP1995-036074A (JP-H07-036074A) has a configuration in which the mechanical shutter is disposed in front of a unit that moves the lens to correct the image shake, and the above problems are not recognized. The unit that moves the lens is heavier than the unit that moves the imaging element. Therefore, the influence of vibration due to the operation of the mechanical shutter is minor.

The imaging device disclosed in JP2012-048215A has a configuration in which the mechanical shutter is disposed in front of the image shake correcting unit, but the above problems are not recognized.

The present invention has been made in view of the above circumstances, and is to provide an imaging device that moves an imaging element to correct image shake, and can improve image quality by making it difficult for vibration caused by the operation of a mechanical shutter to be transmitted to a mechanism that moves the imaging element.

An imaging device according to an aspect of the present invention comprises an image shake corrector that moves an imaging element to perform image shake correction, a lens mount on which the lens device is mounted, an exterior housing that has an opening into which the lens mount is inserted, a shutter mechanism that has, at a position adjacent to a light receiving surface of the imaging element in the image shake corrector, an opening through which a member blocking light incident on the light receiving surface passes, and a mount base that is disposed between the exterior housing and the shutter mechanism, to support the lens mount, in which a part of the exterior housing supports the shutter mechanism, the mount base supports the image shake corrector, and the mount base is supported by the part of the exterior housing.

According to the present invention, it is possible to provide an imaging device that moves an imaging element to correct image shake, and can improve image quality by making it difficult for vibration caused by the operation of a mechanical shutter to be transmitted to a mechanism that moves the imaging element.

DESCRIPTION OF THE PREFERRED EMBODIMENTS

Hereinafter, embodiments of the present invention will be described with reference to the drawings.

Figure 1:
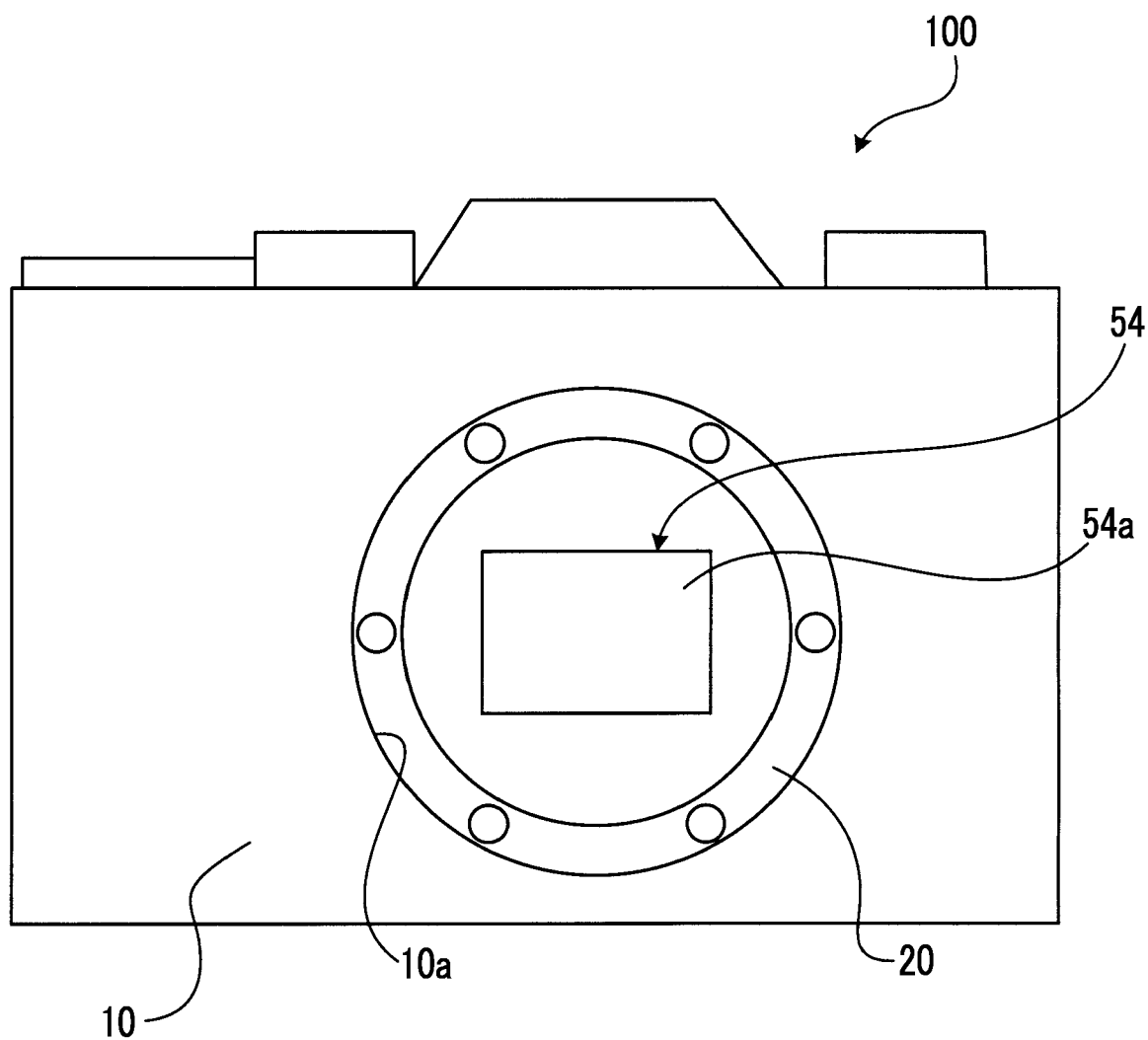
FIG. 1 is a front view schematically showing an external configuration of a digital camera 100, which is an embodiment of an imaging device of the present invention.

FIG. 1 is a front view schematically showing an external configuration of a digital camera 100, which is an embodiment of an imaging device of the present invention. The digital camera 100 is a so-called lens interchangeable digital camera in which a lens device is attachable and detachable.

The digital camera 100 comprises a ring-shaped lens mount 20 which mounts the lens device and perform energization with respect to the lens device, an exterior housing 10 having an opening 10a into which the lens mount 20 is inserted, and an imaging element 54 which images a subject through the lens device mounted on the lens mount 20. The exterior housing 10 is configured by a front housing on the subject side and a rear housing on the opposite side. The exterior housing 10 is made of, for example, resin.

The lens device includes a lens such as a focus lens for adjusting the focal position or a zoom lens for adjusting the focal length, and a diaphragm.

Figure 2:
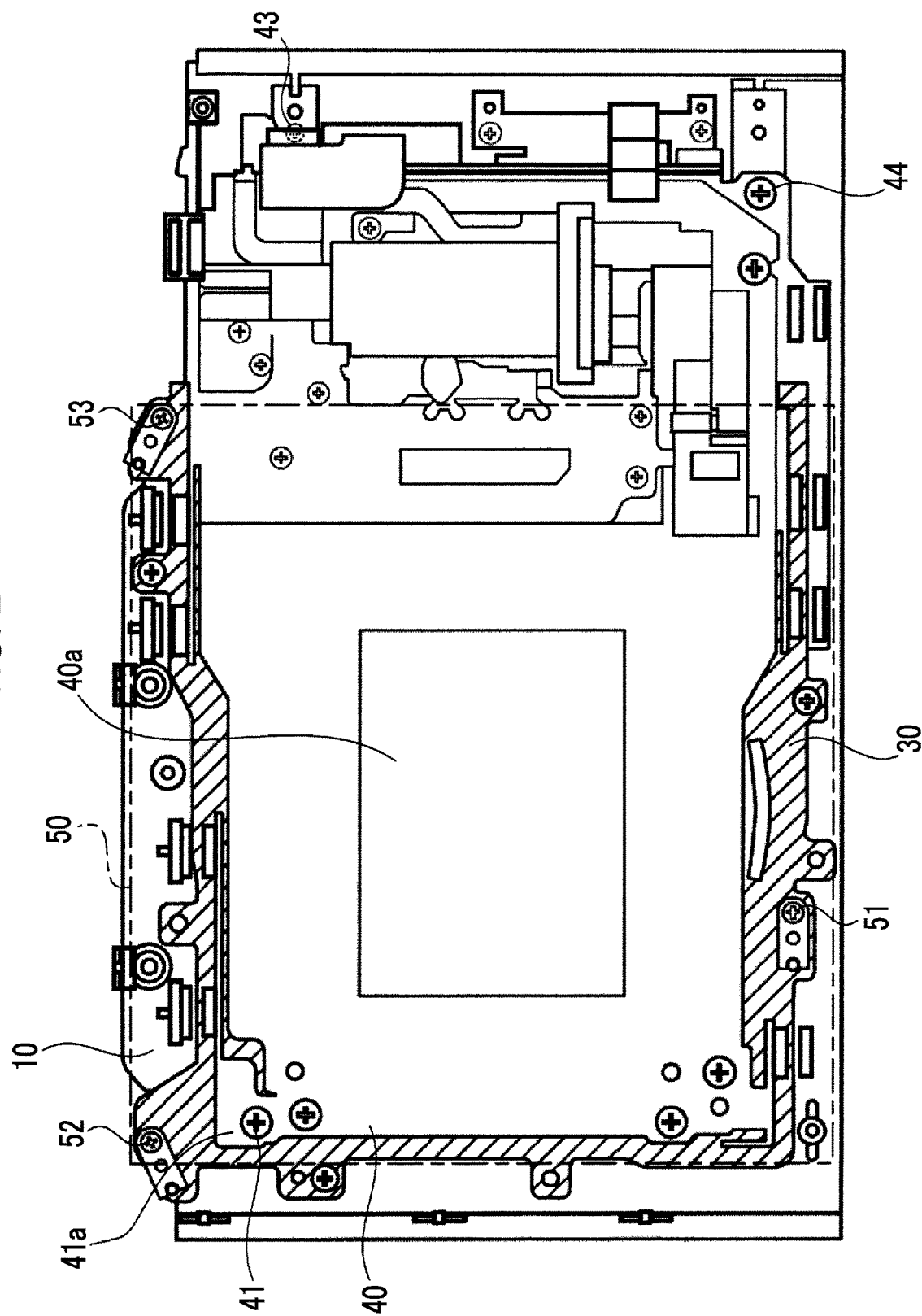
FIG. 2 is a diagram schematically showing a partial configuration inside an exterior housing 10 of the digital camera 100 shown in FIG. 1.
Figure 3:
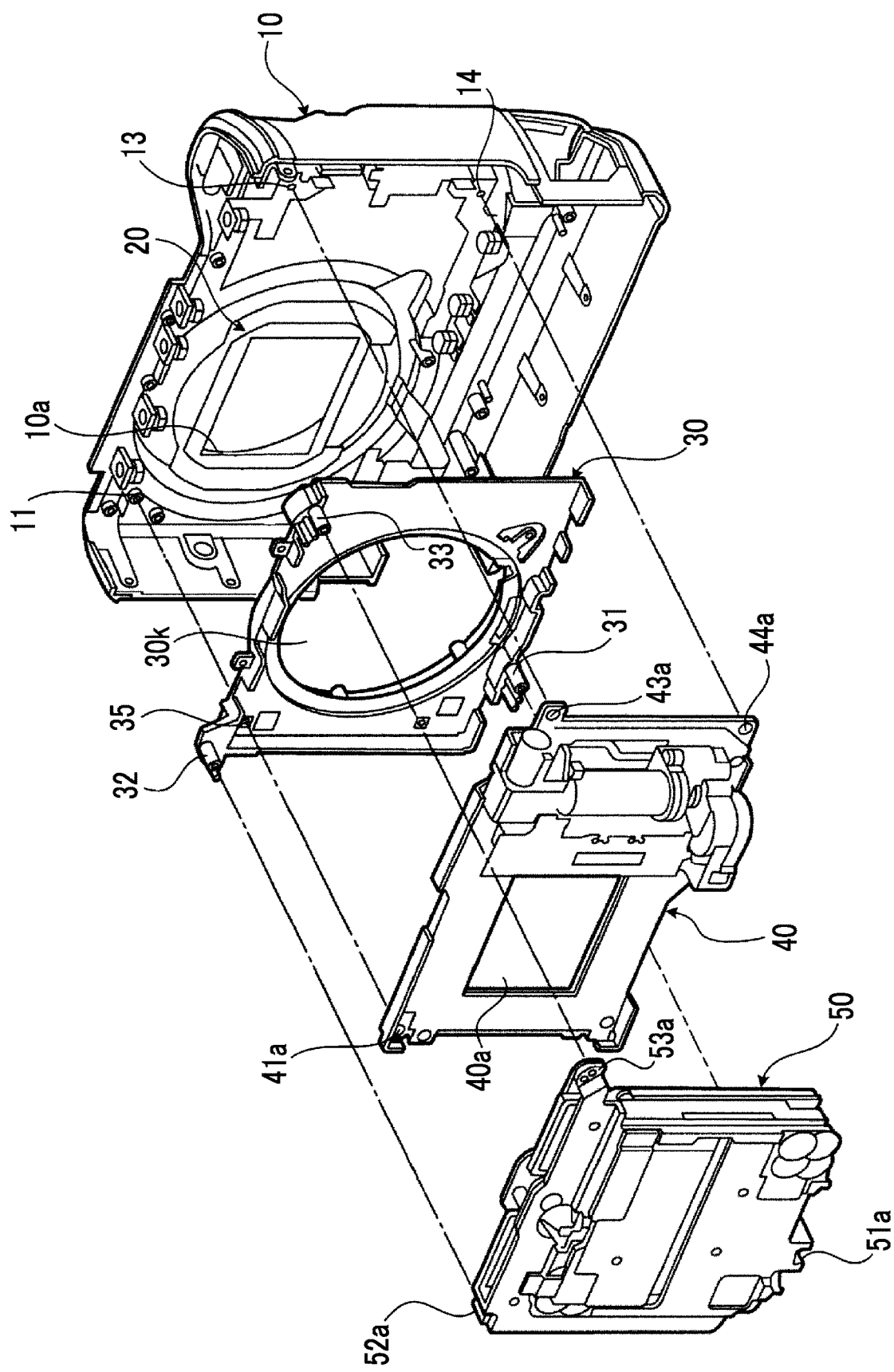
FIG. 3 is an exploded perspective view of components of the digital camera 100 shown in FIG. 2.

FIG. 2 is a diagram schematically showing a partial configuration inside the front housing of the exterior housing 10 of the digital camera 100 shown in FIG. 1. FIG. 2 is a view of the inside of the front housing from the side opposite to the subject side. FIG. 3 is an exploded perspective view of components of the digital camera 100 shown in FIG. 2.

As shown in FIGS. 2 and 3, inside the exterior housing 10 of the digital camera 100, a mount base 30, a shutter mechanism 40, and an image shake correcting unit 50 are arranged in this order from the opening 10*a* side.

The mount base 30 supports the lens mount 20. The mount base 30 is a flat plate-shaped member having an opening 30*k* (see FIG. 3) formed in a portion facing the lens mount 20. The mount base 30 is made of, for example, metal. The mount base 30 is directly fixed to the front housing of the exterior housing 10 by screwing or adhesion. That is, the mount base 30 is supported by the front housing of the exterior housing 10.

The image shake correcting unit 50 includes an imaging element 54 shown in FIG. 1, and is a mechanism that moves the imaging element 54 to perform image shake correction. The image shake correcting unit 50 is fixed to the mount base 30 by screwing or adhesion. That is, the image shake correcting unit 50 is supported by the mount base 30. The mount base 30 configures a second support member that supports the image shake correcting unit 50.

In examples of FIGS. 2 and 3, an end portion 52*a* of the image shake correcting unit 50 (see FIG. 3), and end portion 32 of the mount base 30 (see FIG. 3) are fixed by a screw 52 shown in FIG. 2. Also, an end portion 53*a* of the image shake correcting unit 50 (see FIG. 3), and end portion 33 of the mount base 30 (see FIG. 3) are fixed by a screw 53 shown in FIG. 2. Also, an end portion 51*a* of the image shake correcting unit 50 (see FIG. 3), and end portion 31 of the mount base 30 (see FIG. 3) are fixed by a screw 51 shown in FIG. 2.

The shutter mechanism 40 includes an opening 40*a* through which a member that blocks light incident on a light receiving surface 54*a* (see FIG. 1) passes at a position (specifically, a front surface of the light receiving surface 54*a*) adjacent to the light receiving surface 54*a* of the imaging element 54 of the image shake correcting unit 50. The opening 40*a* is disposed so as to face the opening 30*k* of the mount base 30.

The shutter mechanism 40 is, specifically, a focal plane shutter, and a front curtain and a rear curtain moving in the opening 40*a* configures the above member. The shutter mechanism 40 may control the blocking and passage of light passing through the opening 40*a* by opening and closing a shutter blade used for the lens shutter.

A distance between the light receiving surface 54*a* of the imaging element 54 and the opening 40*a* of the shutter mechanism 40 is very small, and no object exists therebetween.

The shutter mechanism 40 is fixed to the front housing of the exterior housing 10 by screwing or adhesion. That is, the shutter mechanism 40 is supported by the front housing of the exterior housing 10. The front housing of the exterior housing 10 configures a first support member that supports the shutter mechanism 40.

In examples of FIGS. 2 and 3, an end portion 41*a* of the shutter mechanism 40 (see FIG. 3) and a hole 11 provided in the exterior housing 10 are fixed by a screw 41 shown in FIG. 2. The screw 41 is fixed to the hole 11 through a through hole 35 formed in the mount base 30. The through hole 35 has a size such that the screw 41 and an inner peripheral surface of the through hole 35 do not come into contact with each other.

Also, an end portion 43*a* of the shutter mechanism 40 (see FIG. 3) and a hole 13 provided in the exterior housing 10 are fixed by a screw 43 shown in FIG. 2. Also, an end portion 44*a* of the shutter mechanism 40 (see FIG. 3) and a hole 14 provided in the exterior housing 10 are fixed by a screw 44 shown in FIG. 2.

As described above, the digital camera 100 has a configuration in which the shutter mechanism 40 is supported by the front housing of the exterior housing 10, the image shake correcting unit 50 is supported by the mount base 30, and the mount base 30 is supported by the exterior housing 10.

With this configuration, vibration due to the opening and closing operation of the shutter of the shutter mechanism 40 is transmitted to the front housing of the exterior housing 10, the mount base 30, and the image shake correcting unit 50 in this order. As described above, by extending the transmission path of the vibration, the vibration can be sufficiently attenuated, and the image shake correction performance by the image shake correcting unit 50 can be improved.

The digital camera 100 has a configuration in which the shutter mechanism 40 is not fixed to the mount base 30. Therefore, in a case where the shutter mechanism 40 becomes large, it is possible to prevent the mount base 30 from becoming large, and the exterior housing 10 can be made small.

In the digital camera 100, it is preferable that the exterior housing 10 and the mount base 30 be made of materials having different natural frequencies. Specifically, it is preferable that the exterior housing 10 be made of a material having a lower natural frequency than the mount base 30.

As described above, by making the natural frequency of the exterior housing 10 lower than the natural frequency of the mount base 30, the vibration transmitted from the shutter mechanism 40 to the image shake correcting unit 50 can be more effectively attenuated.

It is preferable that the digital camera 100 have a configuration in which an attenuation member such as rubber that attenuates the vibration transmitted from the front housing of the exterior housing 10 to the mount base 30 is added between the front housing of the exterior housing 10 and the mount base 30, and the exterior housing 10 and the mount base 30 are fixed to each other via the attenuation member. With this configuration, the vibration transmitted from the shutter mechanism 40 to the image shake correcting unit 50 can be further attenuated.

The digital camera 100 may have a configuration in which the attenuation member such as rubber that attenuates the vibration transmitted from the shutter mechanism 40 to the exterior housing 10 is added between the front housing of the exterior housing 10 and the shutter mechanism 40, and the front housing of the exterior housing 10 and the shutter mechanism 40 are fixed to each other via the attenuation member.

With this configuration, the vibration transmitted from the shutter mechanism 40 to the image shake correcting unit 50 can be further attenuated. Regarding the fixing of the image shake correcting unit 50 and the mount base 30, it is preferable that the image shake correcting unit 50 and the mount base 30 are directly fixed to each other in order to secure the flatness of the image shake correcting unit 50.

Figure 4:
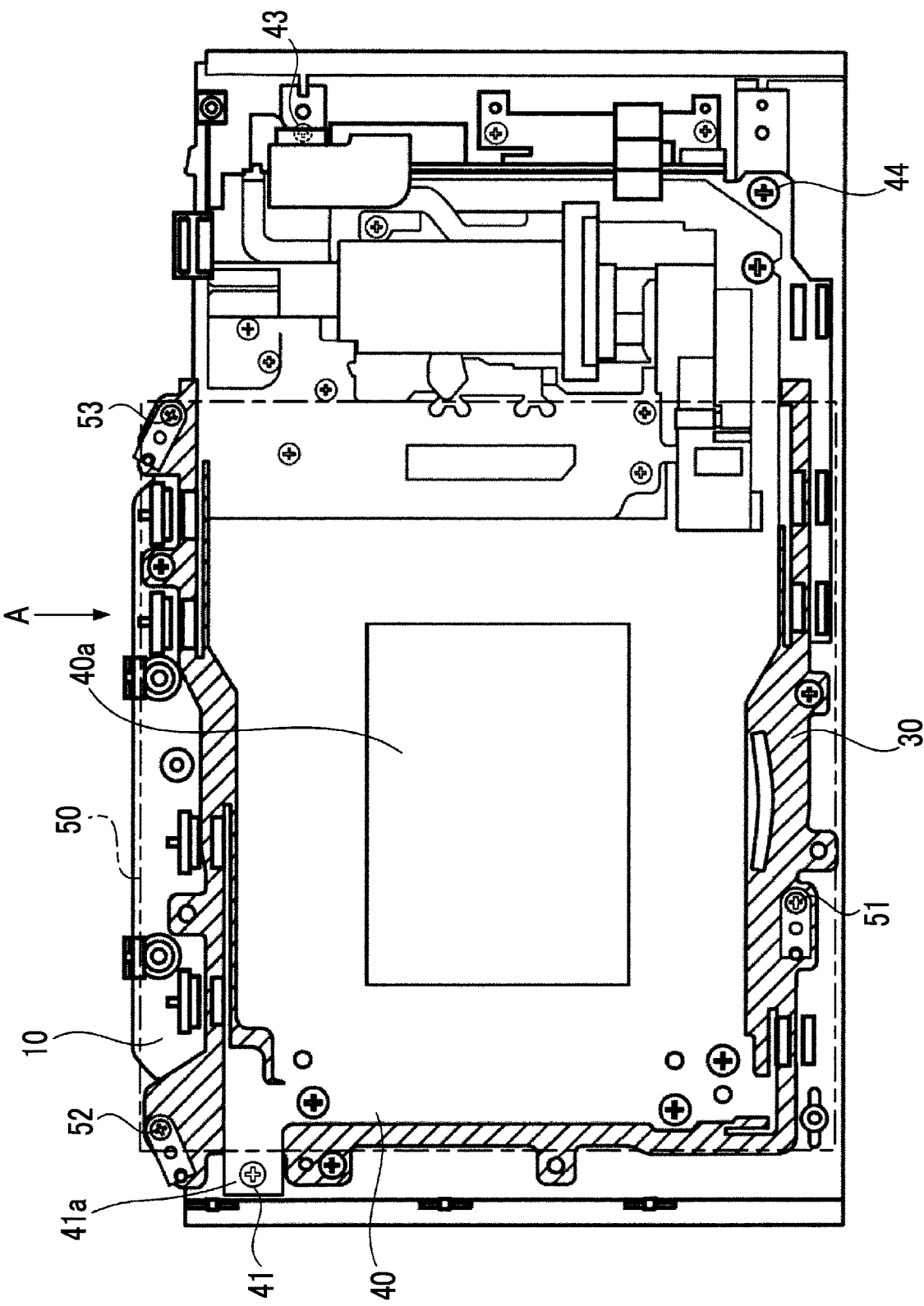
FIG. 4 is a diagram showing a modification example of a configuration inside the front housing shown in FIG. 2.
Figure 5:
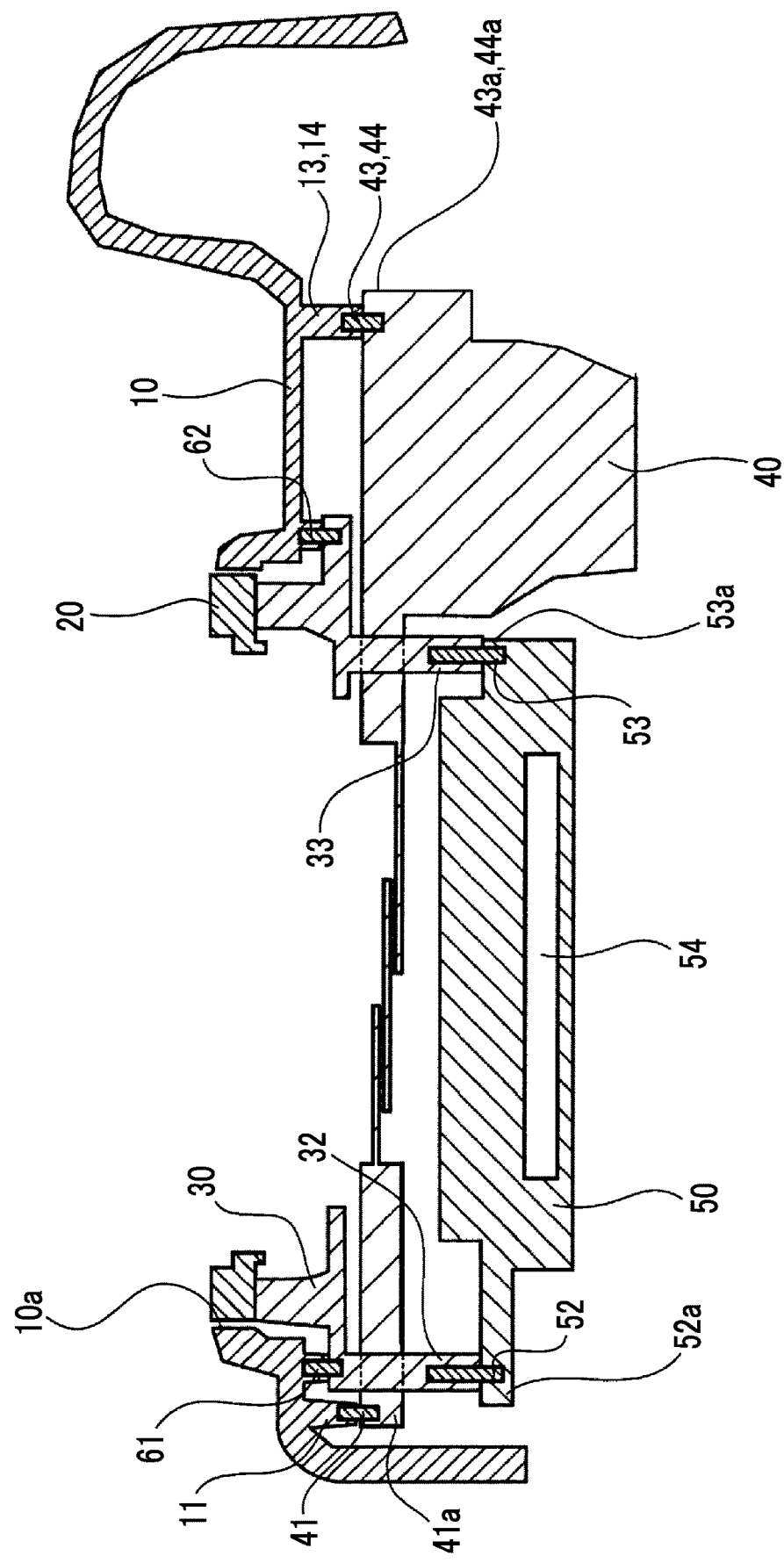
FIG. 5 is a schematic diagram seen from a direction A of FIG. 4.

FIG. 4 is a diagram showing a modification example of a configuration inside the front housing of the digital camera 100 shown in FIG. 2. FIG. 5 is a schematic diagram seen from a direction A of FIG. 4. The modification example shown in FIG. 4 is the same as the configuration shown in FIG. 2 except that the end portion 41a of the shutter mechanism 40 which is a portion fixed to the front housing of the exterior housing 10 by the screw 41 is located in outside the image shake correcting unit 50. In FIG. 5, a screw 61 and a screw 62 for fixing the mount base 30 to the exterior housing 10 are shown.

Figure 6:
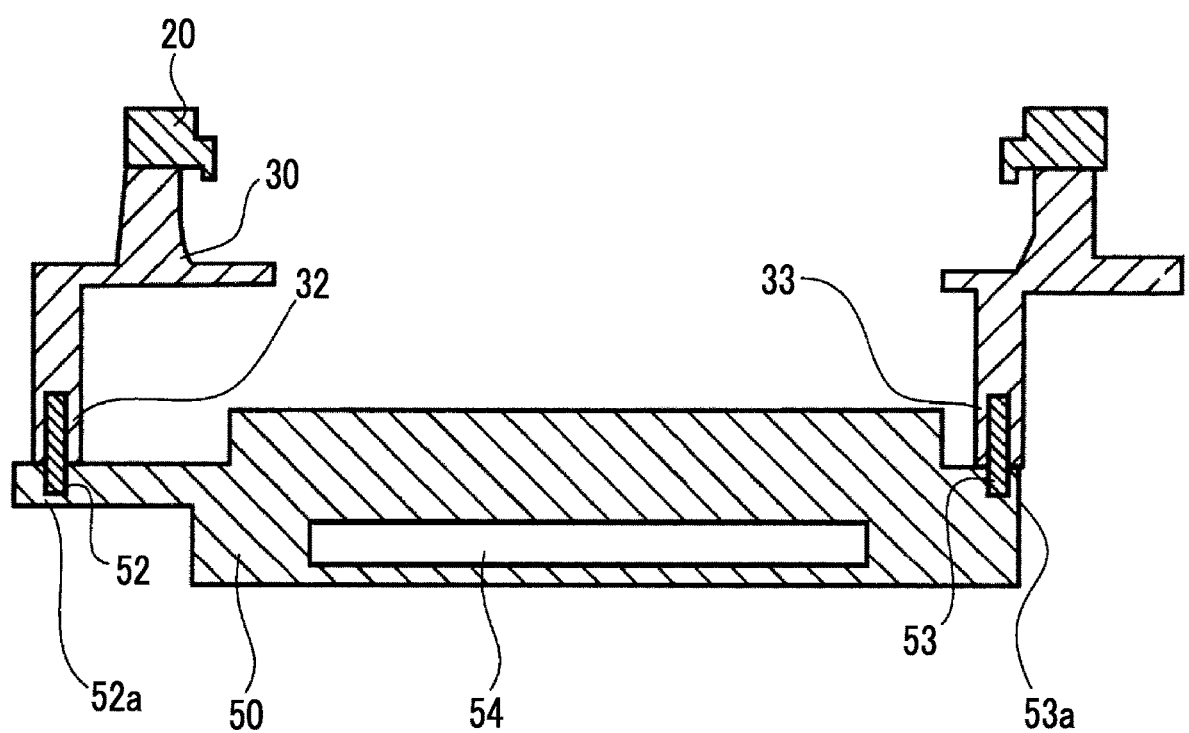
FIG. 6 is a schematic diagram for describing a partial assembly process of the digital camera 100 of the modification example shown in FIGS. 4 and 5.
Figure 7:
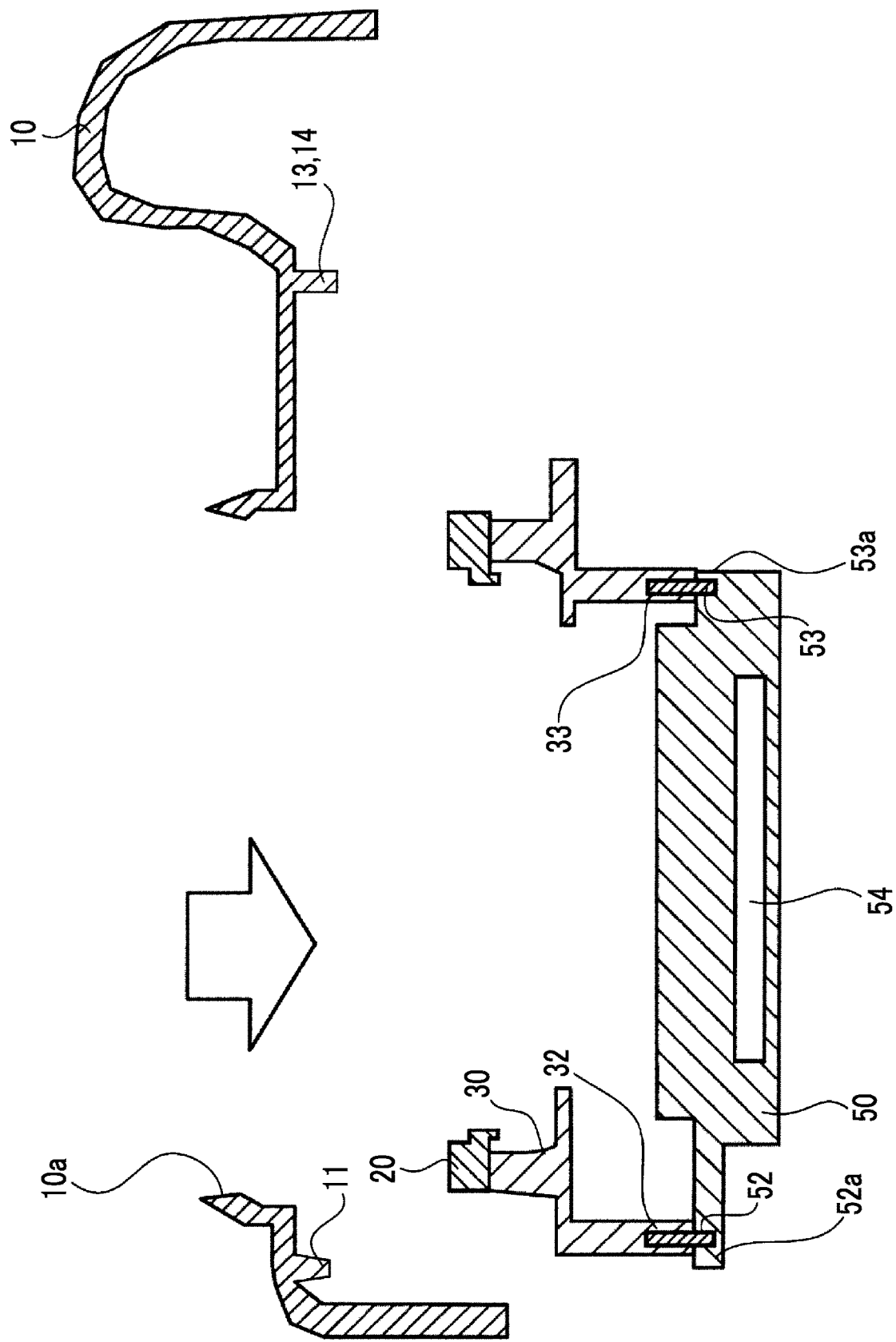
FIG. 7 is a schematic diagram for describing a partial assembly process of the digital camera 100 of the modification example shown in FIGS. 4 and 5.
Figure 8:
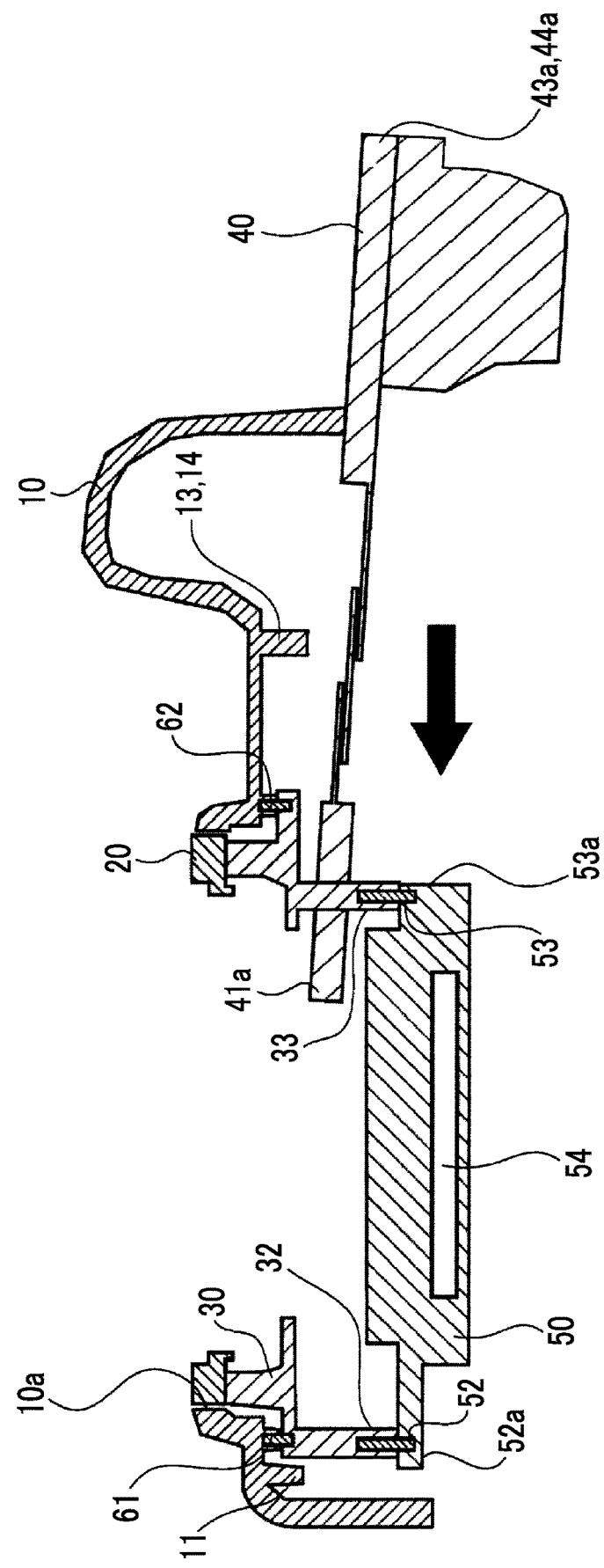
FIG. 8 is a schematic diagram for describing a partial assembly process of the digital camera 100 of the modification example shown in FIGS. 4 and 5.

FIGS. 6 to 8 are schematic diagrams for describing a partial assembly process of the digital camera 100 of the modification example shown in FIGS. 4 and 5. First, the lens mount 20 and the mount base 30 are fixed by adhesion or screwing, and then, the image shake correcting unit 50 is fixed to the mount base 30 by the screws 52 and 53 as shown in FIG. 6.

Next, as shown in FIG. 7, the lens mount 20 is inserted into the opening 10a of the front housing of the exterior housing 10, and the mount base 30 is fixed to the front housing of the exterior housing 10 by the screws 61 and 62 (see FIG. 5).

Finally, as shown in FIG. 8, the shutter mechanism 40 is inserted into the space below the end portions 32 and 33 of the mount base 30, and then, the end portion 41a of the shutter mechanism 40 is fixed to the hole 11 of the front housing of the exterior housing 10 by the screw 52, the end portions 43a and 44a of the shutter mechanism 40 is fixed to the holes 13 and 14 of the front housing of the exterior housing 10 by the screws 43 and 44, and assembly is completed.

As shown in FIG. 4, in the above modification example, there is a configuration in which the front housing of the exterior housing 10 supports the shutter mechanism 40 at the positions (positions of the screws 41, 43, and 44) in the outside the image shake correcting unit 50 in a case of viewed from a direction perpendicular to the light receiving surface 54a. With this configuration, as shown in FIG. 8, the shutter mechanism 40 is attachable and detachable to and from the front housing of the exterior housing 10 while maintaining the fixing of the image shake correcting unit 50 and the mount base 30.

Since the flatness is important, the image shake correcting unit 50 is positioned and fixed with high accuracy to the mount base 30. For example, in a case where the maintenance or replacement of the shutter mechanism 40 is performed, in a case of using the method of releasing the fixing of the image shake correcting unit 50, the work cost for re-fixing the image shake correcting unit 50 occurs. However, in the above modification example, it is possible to remove the shutter mechanism 40 while maintaining fixing of the image shake correcting unit 50. Therefore, it is possible to reduce the workload and cost in a case of maintenance of the digital camera 100.

The lens device is attachable and detachable to and from the digital camera 100 described so far, but even in a case of the digital camera with the lens device fixed to the exterior housing, it is possible to prevent the vibration of the shutter mechanism 40 from being transmitted to the image shake correcting unit 50 by providing a member supporting the image shake correcting unit 50 and a member supporting the shutter mechanism 40 separately, and fixing these two members directly or via the attenuation member.

Next, a configuration of a smartphone will be described as another embodiment of the imaging device of the present invention.

Figure 9:
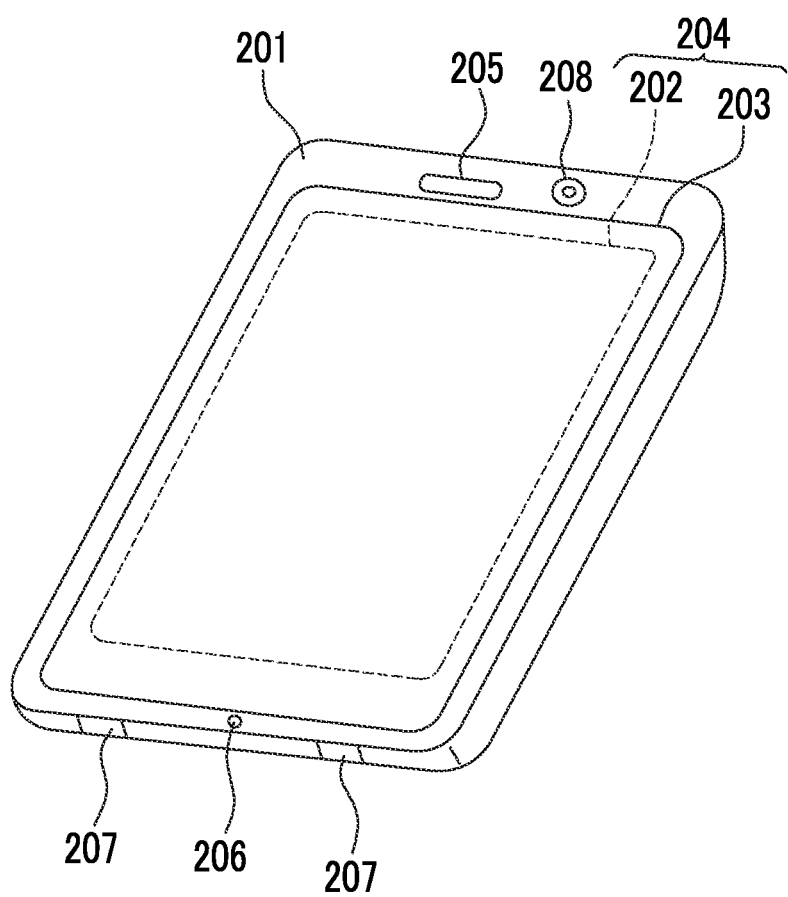
FIG. 9 is a diagram showing the appearance of a smartphone 200, which is another embodiment of the imaging device of the present invention.

FIG. 9 is a diagram showing the appearance of a smartphone 200, which is another embodiment of the imaging device of the present invention.

The smartphone 200 shown in FIG. 9 comprises a flat plate-shaped housing 201, and a display input unit 204 in which a display panel 202 as a display surface and an operation panel 203 as an input unit are integrated on one surface of the housing 201.

Such a housing 201 comprises a speaker 205, a microphone 206, an operating unit 207, and a camera unit 208.

The configuration of the housing 201 is not limited thereto, and for example, a configuration in which the display surface and the input unit are separately provided, or a configuration having a folding structure or a slide mechanism can be adopted.

Figure 10:
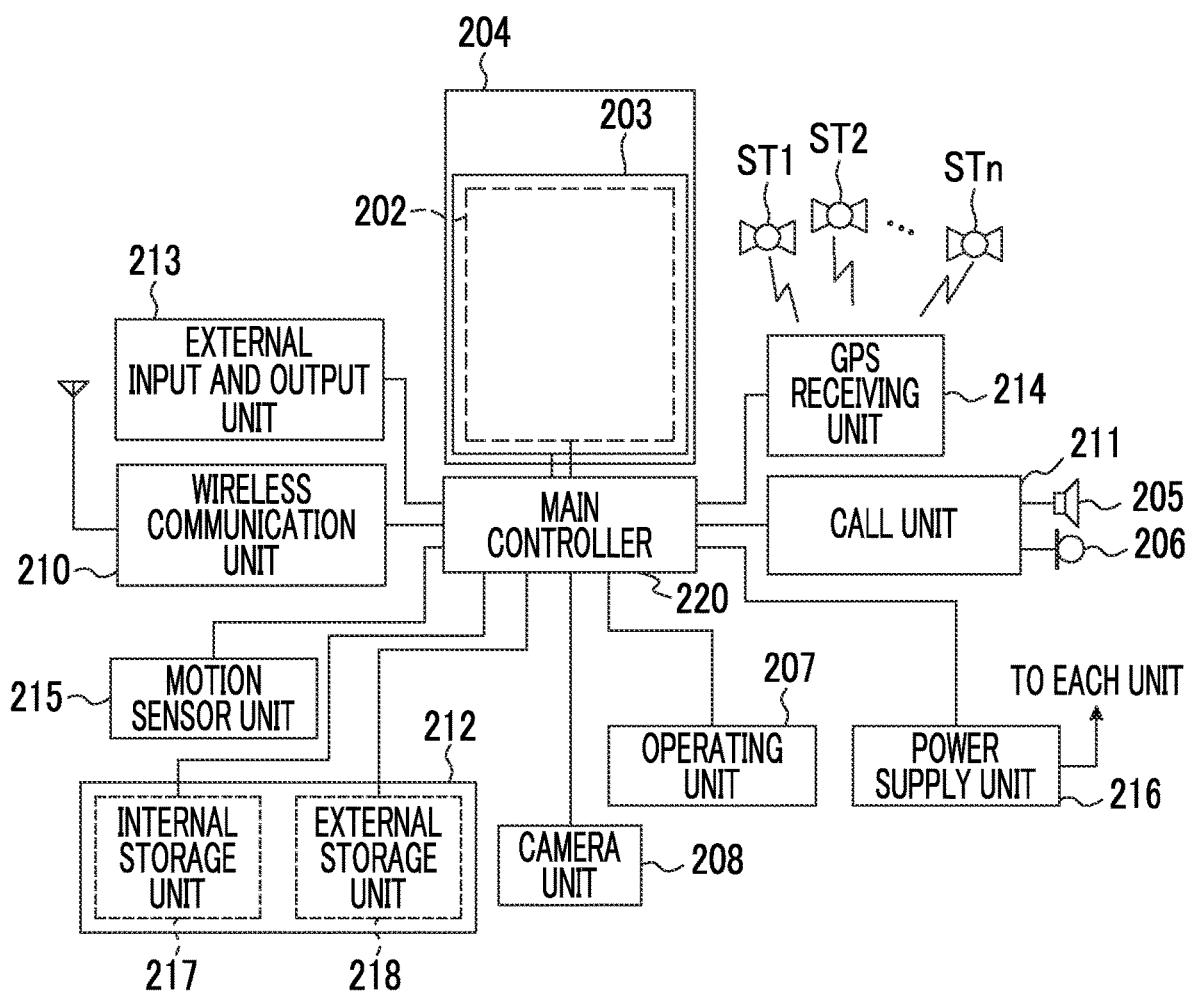
FIG. 10 is a block diagram showing a configuration of the smartphone 200 shown in FIG. 9.

FIG. 10 is a block diagram showing a configuration of the smartphone 200 shown in FIG. 9.

As shown in FIG. 10, the smartphone comprises, as main components, a wireless communication unit 210, the display input unit 204, a call unit 211, the operating unit 207, the camera unit 208, a storage unit 212, an external input and output unit 213, a global positioning system (GPS) receiving unit 214, a motion sensor 215, a power supply unit 216, and a main controller 220.

The smartphone 200 comprises, as a main function, a wireless communication function for performing mobile wireless communication via a base station device BS (not shown) and a mobile communication network NW (not shown).

The wireless communication unit 210 performs wireless communication with the base station device BS accommodated in the mobile communication network NW according to the instruction of the main controller 220. Using the wireless communication, transmission and reception of various file data such as voice data and image data, e-mail data, and reception of web data, or streaming data are performed.

The display input unit 204 is a so-called touch panel that displays images (still images and moving images) or text information under the control of the main controller 220 to visually transmit the information to the user, and detects the user's operation to the displayed information, and comprises the display panel 202 and the operation panel 203.

The display panel 202 uses a liquid crystal display (LCD) or an organic electro-luminescence display (OELD) as a display device.

The operation panel 203 is a device that is placed so as to be capable of visually recognizing the image displayed on the display surface of the display panel 202, and detects one or a plurality of coordinates operated by a user's finger or a stylus. In a case where the device is operated by the user's finger or the stylus, a detection signal generated due to the operation is output to the main controller 220. Then, the main controller 220 detects an operation position (coordinate) on the display panel 202 based on the received detection signal.

As shown in FIG. 10, in the smartphone 200 as the embodiment of the imaging device of the present invention, the display panel 202 and the operation panel 203 are integrated to configure the display input unit 204, and the operation panel 203 is disposed to completely cover the display panel 202.

In a case where such a disposition is adopted, the operation panel 203 may comprise a function of detecting the user's operation even in an area outside the display panel 202. Stated another way, the operation panel 203 may comprise a detection area for the overlapping portion (hereinafter, referred to as a display area) that overlaps the display panel 202, and a detection area for the outer edge portion (hereinafter, referred to as a non-display area) that does not overlap the display panel 202 other than the overlapping portion.

The size of the display area and the size of the display panel 202 may be completely matched, but it is not always necessary to match two sizes.

Also, the operation panel 203 may comprise two sensitive areas in the outer edge portion and the inner portion other than the outer edge portion. Further, the width of the outer edge portion is appropriately designed depending on the size of the housing 201 and the like.

Furthermore, examples of a position detection method adopted in the operation panel 203 include a matrix switch method, a resistive film method, a surface acoustic wave method, an infrared method, an electromagnetic induction method, and a capacitance method, and any method can be adopted.

The call unit 211 comprises the speaker 205 or the microphone 206, and converts the user's voice input through the microphone 206 into voice data that can be processed by the main controller 220 to output the converted voice data to the main controller 220, or decodes the voice data received by the wireless communication unit 210 or the external input and output unit 213 to output the decoded voice data through the speaker 205.

As shown in FIG. 9, for example, the speaker 205 can be mounted on the same surface in which the display input unit 204 is provided, and the microphone 206 can be mounted on the side surface of the housing 201.

The operating unit 207 is a hardware key using a key switch or the like, and receives an instruction from the user.

For example, as shown in FIG. 9, the operating unit 207 is mounted on the side surface of the housing 201 of the smartphone 200, and is a push button type switch that is turned on in a case of being pressed with a finger or the like and is turned off by a restoring force such as a spring in a case where the finger is released.

The storage unit 212 stores a control program and control data of the main controller 220, application software, address data associated with the name or telephone number of a communication partner, data of transmitted and received e-mail, Web data downloaded from Web browsing, and downloaded content data, or temporarily stores streaming data and the like. The storage unit 212 is configured by an internal storage unit 217 built in the smartphone and an external storage unit 218 having a slot for an attachable and detachable external memory.

Each of the internal storage unit 217 and the external storage unit 218 configuring the storage unit 212 is realized by using a storage medium such as a memory of a flash memory type, hard disk type, a multimedia card micro type, or a card type (for example, MicroSD (registered trademark) memory), a random access memory (RAM), a read only memory (ROM), and the like.

The external input and output unit 213 serves as an interface with all external devices connected to the smartphone 200, and is directly or indirectly connected to other external devices through communication (for example, a universal serial bus (USB), institute of electrical and electronics engineers (IEEE) 1394, or the like), or a network (for example, the Internet, wireless LAN, Bluetooth (registered trademark), radio frequency identification (RFID), infrared data association (IrDA; registered trademark), ultra wideband (UWB; registered trademark), ZigBee (registered trademark), or the like).

Examples of the external devices connected to the smartphone 200 include a wired/wireless headset, a wired/wireless external charger, a wired/wireless data port, a memory card and a subscriber identity module (SIM)/user identity module (UIM) card connected via a card socket, external audio and video devices connected via audio and video input/output (I/O) terminals, wirelessly connected external audio and video, a wired/wireless smartphone, a wired/wirelessly connected personal computer, a wired/wirelessly connected earphones, or the like.

The external input and output unit 213 can transmit data transmitted from such external devices to components inside the smartphone 200, or transmit data inside the smartphone 200 to the external devices.

The GPS receiving unit 214 receives GPS signals transmitted from GPS satellites ST1 to STn in accordance with an instruction of the main controller 220, and executes positioning calculation processing based on the received GPS signals to detect the position of the smartphone 200 including latitude, longitude, and altitude.

In a case where positional information can be acquired from the wireless communication unit 210 or the external input and output unit 213 (for example, the wireless LAN), the GPS receiving unit 214 can detect the position by using the positional information.

The motion sensor 215 comprises, for example, a three-axis acceleration sensor, and detects the physical movement of the smartphone 200 in accordance with an instruction of the main controller 220.

By detecting the physical movement of the smartphone 200, the moving direction or the acceleration of the smartphone 200 is detected. The detection result is output to the main controller 220.

The power supply unit 216 supplies electric power stored in a battery (not shown) to each unit of the smartphone 200 in accordance with an instruction of the main controller 220.

The main controller 220 comprises a microprocessor, operates in accordance with the control program and the control data stored in the storage unit 212, and controls the units of the smartphone 200 in an integrated manner.

The main controller 220 comprises a mobile communication control function of controlling units of the communication system, and an application processing function in order to perform voice communication or data communication through the wireless communication unit 210.

The application processing function is realized by the main controller 220 operating in accordance with the application software stored in the storage unit 212.

Examples of the application processing function include an infrared ray communication function of controlling the external input and output unit 213 to perform data communication with an opposite device, an e-mail function of performing transmission and reception of e-mail, or a web browsing function of browsing a web page.

Also, the main controller 220 comprises an image processing function of displaying a video on the display input unit 204 based on the image data (data of still image or moving image) such as received data or downloaded streaming data.

The image processing function is a function in which the main controller 220 decodes the image data, performs image processing on the decoding result, and displays the image on the display input unit 204.

Furthermore, the main controller 220 executes display control on the display panel 202 and operation detecting control of detecting the user's operation through the operating unit 207 and the operation panel 203.

By executing the display control, the main controller 220 displays a software key such as an icon or a scroll bar for starting an application software, or displays a window for creating an e-mail.

The scroll bar is a software key for receiving an instruction to move a displayed portion of the image for a large image that cannot fit in the display area of the display panel 202.

By executing the operation detecting control, the main controller 220 detects the user's operation through the operating unit 207, receives the operation on the icon and an input of the character string for the input field of the window through the operation panel 203, or receives a scroll request of the displayed image through the scroll bar.

By executing the operation detecting control, the main controller 220 comprises a touch panel control function of determining whether the operation position on the operation panel 203 is the overlapping portion (display area) that overlaps the display panel 202, or the outer edge portion (non-display area) that does not overlap the display panel 202 other than the overlapping portion, and controlling the sensitive area of the operation panel 203 and the display position of the software key.

The main controller 220 can detect a gesture operation on the operation panel 203 and execute a preset function in accordance with the detected gesture operation.

The gesture operation is not a usual simple touch operation, but an operation of drawing a locus with a finger, designating a plurality of positions at the same time, or combination thereof to draw a locus for at least one from a plurality of positions.

The camera unit 208 includes the shutter mechanism 40 and the image shake correcting unit 50 of the digital camera 100 shown in FIG. 1.

In the smartphone 200, the main controller 220 controls the image shake correcting unit 50 based on the information of the motion sensor 215 to perform the image shake correction.

The captured image data generated by the camera unit 208 can be stored in the storage unit 212 and output through the external input and output unit 213 or the wireless communication unit 210.

In the smartphone 200 shown in FIG. 9, the camera unit 208 is mounted on the same surface as the display input unit 204, but the mounting position of the camera unit 208 is not limited thereto, and the camera unit 208 may be mounted on the rear surface of the display input unit 204.

The camera unit 208 can be used for various functions of the smartphone 200. For example, the image acquired by the camera unit 208 can be displayed on the display panel 202, or the image from the camera unit 208 can be used as one of operation input of the operation panel 203.

In a case where the GPS receiving unit 214 detects a position, the position can be detected by referring to the image from the camera unit 208. Furthermore, the optical axial direction of the camera unit 208 of the smartphone 200 can be determined or the current usage environment can be determined by referring the image from the camera unit 208 and without using the three-axis acceleration sensor, or using combination of the image and the three-axis acceleration sensor. Needless to say, the image from the camera unit 208 can be used in the application software.

In addition, the image data of the still image or the moving image can be stored in the storage unit 212 with the positional information acquired by the GPS receiving unit 214, the voice information (it may be the text information obtained by converting the voice to the text by the main controller) acquired by the microphone 206, or the posture information acquired by the motion sensor 215, or output through the external input and output unit 213 or the wireless communication unit 210.

Even in the smartphone 200 having the above configuration, it is possible to prevent the vibration of the shutter mechanism 40 from being transmitted to the image shake correcting unit 50 by providing a member supporting the image shake correcting unit 50 and a member supporting the shutter mechanism 40 separately, and fixing these two members directly or via the attenuation member.

As described above, the following matters are disclosed in this specification.

(1) An imaging device comprising an image shake correcting unit that moves an imaging element to perform image shake correction; a shutter mechanism that has, at a position adjacent to a light receiving surface of the imaging element of the image shake correcting unit, an opening through which a member blocking light incident on the light receiving surface passes; a first support member that supports the shutter mechanism; and a second support member that supports the image shake correcting unit, in which the second support member is supported by the first support member.

(2) The imaging device according to (1), in which a lens device is attachable and detachable to and from the imaging device.

(3) The imaging device according to (2), in which a lens mount on which the lens device is mounted, an exterior housing that has an opening into which the lens mount is inserted, and a mount base that is disposed between the exterior housing and the shutter mechanism to support the lens mount are provided, the first support member is a part of the exterior housing, and the second support member is the mount base.

(4) The imaging device according to any one of (1) to (3), in which a natural frequency of the first support member is lower than a natural frequency of the second support member.

(5) The imaging device according to any one of (1) to (4), in which the second support member is directly fixed to the first support member.

(6) The imaging device according to any one of (1) to (4), further comprising an attenuation member that is provided between the first support member and the second support member to attenuate vibration transmitted to the second support member from the first support member, in which the second support member is fixed to the first support member via the attenuation member.

(7) The imaging device according to any one of (1) to (6), in which the first support member supports the shutter mechanism at a position outside the image shake correcting unit as viewed from a direction perpendicular to the light receiving surface.

(8) The imaging device according to any one of (1) to (7), in which the shutter mechanism is a focal plane shutter.

Although various embodiments have been described above with reference to the drawings, the present invention is not limited thereto. It is obvious to those skilled in the art that various changes or modifications can be conceived within the scope described in the claims, and naturally, such changes or modifications also belong to the technical scope of the present invention. Further, the components in the above-described embodiments may be optionally combined without departing from the spirit of the invention.

This application is based on a Japanese patent application filed on Jul. 27, 2018 (Japanese Patent Application No. 2018-141575), the contents of which are incorporated herein by reference.

The present invention is particularly convenient and effective in a case of being applied to a lens interchangeable digital camera or the like.

EXPLANATION OF REFERENCES

100: digital camera
10: exterior housing
10a: opening
11, 13, 14: hole
20: lens mount
54: imaging element
54a: light receiving surface
30: mount base
30k: opening
31, 32, 33: end portion
35: through hole
40: shutter mechanism
40a: opening
41a, 43a, 44a: end portion
41, 43, 44: screw
50: image shake correcting unit
51a, 52a, 53a: end portion
51, 52, 53: screw
61, 62: screw
200: smartphone
201: housing
202: display panel
203: operation panel
204: display input unit
205: speaker
206: microphone
207: operating unit
208: camera unit
210: wireless communication unit
211: call unit
212: storage unit
213: external input and output unit
214: GPS receiving unit
215: motion sensor
216: power supply unit
217: internal storage unit
218: external storage unit
220: main controller
ST1 to STn: GPS satellite

What is claimed is:

1. An imaging device that a lens device is attachable to and detachable from, comprising:
   an image shake corrector that moves an imaging element to perform image shake correction;
   a lens mount on which the lens device is mounted;
   an exterior housing that has an opening into which the lens mount is inserted;
   a shutter mechanism that has, at a position adjacent to a light receiving surface of the imaging element in the image shake corrector, an opening through which a member blocking light incident on the light receiving surface passes; and
   a mount base that is disposed between the exterior housing and the shutter mechanism, to support the lens mount, wherein
   a part of the exterior housing supports the shutter mechanism,
   the mount base supports the image shake corrector, and
   the mount base is supported by the part of the exterior housing.

2. The imaging device according to claim 1, wherein a natural frequency of the part of the exterior housing is lower than a natural frequency of the mount base.

3. The imaging device according to claim 2, wherein the mount base is directly fixed to the part of the exterior housing.

4. The imaging device according to claim 3, wherein the part of the exterior housing supports the shutter mechanism at a position outside the image shake corrector as viewed from a direction perpendicular to the light receiving surface.

5. The imaging device according to claim 4, wherein the shutter mechanism is a focal plane shutter.

6. The imaging device according to claim 3, wherein the shutter mechanism is a focal plane shutter.

7. The imaging device according to claim 2, wherein the part of the exterior housing supports the shutter mechanism at a position outside the image shake corrector as viewed from a direction perpendicular to the light receiving surface.

8. The imaging device according to claim 7, wherein the shutter mechanism is a focal plane shutter.

9. The imaging device according to claim 2, wherein the shutter mechanism is a focal plane shutter.

10. The imaging device according to claim 1, wherein the mount base is directly fixed to the part of the exterior housing.

11. The imaging device according to claim 10, wherein the part of the exterior housing supports the shutter mechanism at a position outside the image shake corrector as viewed from a direction perpendicular to the light receiving surface.

12. The imaging device according to claim 11, wherein the shutter mechanism is a focal plane shutter.

13. The imaging device according to claim 10, wherein the shutter mechanism is a focal plane shutter.

14. The imaging device according to claim 1, wherein the part of the exterior housing supports the shutter mechanism at a position outside the image shake corrector as viewed from a direction perpendicular to the light receiving surface.

15. The imaging device according to claim 14, wherein the shutter mechanism is a focal plane shutter.

16. The imaging device according to claim 1, wherein the shutter mechanism is a focal plane shutter.

17. The imaging device according to claim 1, wherein the mount base is supported by the part of the exterior housing via an attenuation member that attenuates vibration transmitted from the part of the exterior housing to the mount base.

* * * * *